United States Patent
Havard, Jr. et al.

(10) Patent No.: US 9,884,394 B2
(45) Date of Patent: Feb. 6, 2018

(54) SOLENOID CONTROL METHODS FOR DUAL FLOW HVAC SYSTEMS

(71) Applicant: Lennox Industries Inc., Richardson, TX (US)

(72) Inventors: Harold Gene Havard, Jr., Carrollton, TX (US); Rakesh Goel, Irving, TX (US); Rosa Maria Leal, Irving, TX (US); Thomas Edward Pate, Jr., Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 234 days.

(21) Appl. No.: 14/626,851

(22) Filed: Feb. 19, 2015

(65) Prior Publication Data
US 2015/0330686 A1   Nov. 19, 2015

Related U.S. Application Data

(60) Provisional application No. 62/000,415, filed on May 19, 2014, provisional application No. 62/002,606, filed on May 23, 2014.

(51) Int. Cl.
*F25B 41/04* (2006.01)
*B23P 15/26* (2006.01)

(52) U.S. Cl.
CPC .............. *B23P 15/26* (2013.01); *F25B 41/04* (2013.01); *F25B 2500/07* (2013.01); *F25B 2500/26* (2013.01); *F25B 2600/2519* (2013.01); *Y10T 29/49361* (2015.01)

(58) Field of Classification Search
CPC .......... F25B 2600/2519; F25B 2500/07; F25B 2500/26; F25B 41/04
See application file for complete search history.

(56) References Cited

U.S. PATENT DOCUMENTS

| | | | | |
|---|---|---|---|---|
| 4,790,142 A | * | 12/1988 | Beckey | F25B 13/00 62/115 |
| 5,025,634 A | * | 6/1991 | Dressler | F24J 3/081 62/160 |
| 5,230,223 A | * | 7/1993 | Hullar | F25B 41/006 62/126 |
| 5,402,652 A | * | 4/1995 | Alsenz | F25B 41/062 251/129.15 |
| 5,461,876 A | * | 10/1995 | Dressler | F24J 3/083 237/2 B |
| 5,983,660 A | * | 11/1999 | Kiessel | F25B 13/00 62/260 |
| 6,141,973 A | * | 11/2000 | Whitmore | F25B 9/02 62/50.1 |

(Continued)

*Primary Examiner* — Kun Kai Ma
(74) *Attorney, Agent, or Firm* — Baker Botts L.L.P.

(57) ABSTRACT

Provided are a method and apparatus for reducing a refrigerant pressure difference within an HVAC system having a controller, one or more compressors, and at least two paths of refrigerant piping comprising alternative paths for refrigerant flow through the HVAC system. A valve is coupled to each refrigerant piping path for permitting, or preventing, refrigerant flow through each of the alternate paths of refrigerant piping. The controller may open at least one valve for a defined period of time in response to a triggering input to allow a refrigerant pressure difference within the HVAC system to dissipate across the opened valve.

18 Claims, 4 Drawing Sheets

(56) References Cited

U.S. PATENT DOCUMENTS

| | | | | |
|---|---|---|---|---|
| 6,286,322 B1* | 9/2001 | Vogel | F25B 47/025 | 62/278 |
| 6,301,912 B1* | 10/2001 | Terai | F04C 23/008 | 418/55.5 |
| 8,776,543 B2* | 7/2014 | Wiggs | F25B 30/06 | 62/260 |
| 2005/0204757 A1* | 9/2005 | Micak | F25D 17/062 | 62/157 |
| 2006/0162358 A1* | 7/2006 | VanderZee | F25B 49/02 | 62/225 |
| 2006/0266060 A1* | 11/2006 | Choi | F25B 41/04 | 62/196.1 |
| 2006/0288724 A1* | 12/2006 | Ambs | F25B 13/00 | 62/260 |
| 2007/0012056 A1* | 1/2007 | Makishima | F04B 27/1804 | 62/228.1 |
| 2007/0151270 A1* | 7/2007 | Matsunaga | B60H 1/00885 | 62/216 |
| 2008/0016896 A1* | 1/2008 | Rasch | F25B 47/02 | 62/278 |
| 2011/0126560 A1* | 6/2011 | Wightman | F25B 47/02 | 62/80 |
| 2012/0167602 A1* | 7/2012 | Taras | F25B 49/02 | 62/115 |
| 2013/0031919 A1* | 2/2013 | Buckenham | F25B 49/027 | 62/89 |
| 2013/0174589 A1* | 7/2013 | Wightman | F25B 13/00 | 62/81 |
| 2013/0312436 A1* | 11/2013 | Chen | F25B 47/025 | 62/81 |
| 2014/0109605 A1* | 4/2014 | Qu | F25B 49/02 | 62/118 |
| 2015/0059372 A1* | 3/2015 | Weiss | F25B 13/00 | 62/115 |
| 2016/0258658 A1* | 9/2016 | Hirota | F25B 17/083 | |

* cited by examiner

SOLENOID CONTROL METHODS FOR DUAL FLOW HVAC SYSTEMS

CROSS-REFERENCE TO RELATED APPLICATIONS

This application is a continuation in part of Provisional Applications No. 62/000,415, filed May 19, 2014, and Application No. 62/002,606, filed May 23, 2014, and claims priority therefrom. The contents of the prior applications are hereby incorporated by reference with the same effect as if fully set forth herein.

FIELD OF THE INVENTION

This application is directed, in general, to heating, ventilation, and air conditioning systems (HVAC) and, more specifically, to methods of reducing refrigerant pressure differential across an HVAC system prior to compressor start up.

DESCRIPTION OF THE RELATED ART

To increase operating efficiency, HVAC systems may be provided with multiple system components of varying sizes and capacities for matching the HVAC system operation to the demand placed upon it. Such HVAC systems may be provided with refrigerant piping configured to allow for refrigerant to be routed through one or more alternative paths through the HVAC system. The piping configuration may allow the HVAC system refrigerant to be routed to, or away from, specific HVAC system components so that refrigerant is permitted to flow only through the HVAC system components with sizes, or capacities, which match the current demand on the HVAC system, with other components closed off from the refrigerant flow.

The particular refrigerant path utilized by the HVAC system is oftentimes controlled through the use of valves. The valves may cause sections of an HVAC system refrigerant piping to be closed off from one another at times when some, or all, of the valves are in the closed position. A potentially harmful consequence of closing off one, or more, sections of the refrigerant piping of an HVAC system from the rest of the HVAC system is that refrigerant pressure equalization throughout the HVAC system following charging or system operation is prevented. HVAC system startup during times when a high refrigerant pressure differential exists within the piping of the HVAC system may be harmful to the HVAC system compressor, or compressors, and may cause high or low pressure switches to trip at system startup.

SUMMARY

In accordance with the present invention, a method and apparatus for reducing refrigerant pressure differential across an HVAC system provided with one or more normally closed valves is provided.

A first apparatus is provided for reducing a refrigerant pressure difference within an HVAC system during non-operating time of the HVAC system. The first apparatus may comprise a compressor section which may comprise one or more compressors. Each compressor may receive low pressure refrigerant from a first heat exchanger through a common suction pipe and may discharge high pressure refrigerant to a second heat exchanger through a common discharge pipe during operation of the HVAC system. The first apparatus may further comprise a metering section which may receive high pressure refrigerant from the second heat exchanger from a common high pressure pipe and may discharge low pressure refrigerant to the first heat exchanger through a common low pressure pipe. The metering section may comprise a first pipe which may couple to the common high pressure pipe at a first inlet and may couple to the common low pressure pipe at a first outlet. A first valve may couple to the first pipe. The first valve may permit refrigerant flow through the first pipe when in an open position. The first valve may prevent refrigerant flow through the first pipe when in a closed position. The metering section may comprise a first metering device coupled to the first pipe. The first metering device may throttle refrigerant flow through the first pipe. The metering section may comprise a second pipe which may couple to the common high pressure pipe at a second inlet and may couple to the common low pressure pipe at a second outlet. The metering section may comprise a second valve which may couple to the second pipe. The second valve may permit refrigerant flow through the second pipe when in an open position, and the second valve may prevent refrigerant flow through the second pipe when in a closed position. The metering section may comprise a second metering device which may couple to the second pipe. The second metering device may throttle refrigerant flow through the second pipe. The first apparatus may further comprise a controller which may operably couple to each of the first and second valves and may switch each of the first and second valves between open and closed positions. The controller may select at least the first pipe as a refrigerant flow path for reducing a refrigerant pressure difference within the HVAC system. The controller may generate a first control signal to open at least the first valve permitting refrigerant to flow through the valve, dissipating any refrigerant pressure difference across the valve. The controller may hold at least the first valve open for a defined period of time. The controller may generate a second control signal for switching the position of at least the first valve.

A first method of dissipating a refrigerant pressure difference within an HVAC system during non-operating time is provided. A compressor section may couple to a first and second heat exchanger. The compressor section may comprise one or more compressors, wherein each compressor may receive low pressure refrigerant from the first heat exchanger through a common suction pipe and may discharge high pressure refrigerant to the second heat exchanger through a common discharge pipe during operating time of the HVAC system. A first pipe may couple to a common high pressure pipe at an inlet of the first pipe and may receive high pressure refrigerant from the second heat exchanger through the common high pressure pipe. A common low pressure pipe may couple the first pipe to at an outlet of the first pipe. The common low pressure pipe may route low pressure refrigerant to the first heat exchanger. A first valve may couple to the first pipe. The first valve may permit refrigerant flow through the first pipe when in an open position and may prevent refrigerant flow through the first pipe when in a closed position. A first metering device may couple to the first pipe. The first metering device may throttle flow of refrigerant through the first pipe. A common high pressure pipe may couple to a second pipe to at an inlet of the second pipe. The second pipe may receive high pressure refrigerant from the second heat exchanger through the common high pressure pipe. The common low pressure pipe may couple to the second at an outlet of the second pipe and may route low pressure refrigerant to the second heat exchanger. A second valve may couple to the second pipe. The second valve may permit refrigerant flow through the second pipe when in an open position and may prevent refrigerant flow through the second pipe when in a closed position. A second metering device may couple to the second pipe and may throttle flow of refrigerant through the second pipe. A controller may operably couple to the first and second valves to switch each of the first and second valves between open and closed positions. The controller may select at least the first pipe as a refrigerant flow path for reducing a refrigerant pressure difference within the HVAC system. The controller may generate a first control signal opening at least the first valve permitting refrigerant to flow through the valve, dissipating any refrigerant pressure difference across the valve. The controller may maintain at least the first valve open for a defined period of time. The controller may generate a second control signal to switch the position of at least the first valve.

An HVAC system, as described herein, implementing the methods provided may utilize system components sized efficiently to meet demands of differing capacities upon the HVAC system, with the components disposed on parallel legs of piping within the HVAC system. Advantageously, the use of valves and control methods provided allows for selectively routing the HVAC system refrigerant through the components most closely matching the demand on the HVAC system during times in which one or more compressors are operating while creating a passageway for pressure differentials to dissipate during compressor non-operating time. The dissipation of pressure during non-operation time may ensure safer operating conditions for the compressors at startup.

BRIEF DESCRIPTION OF THE DRAWINGS

For a more complete understanding of the present invention and the advantages thereof, reference is now made to the following Detailed Description taken in conjunction with the accompanying drawings, in which.

DETAILED DESCRIPTION

Figure 1:
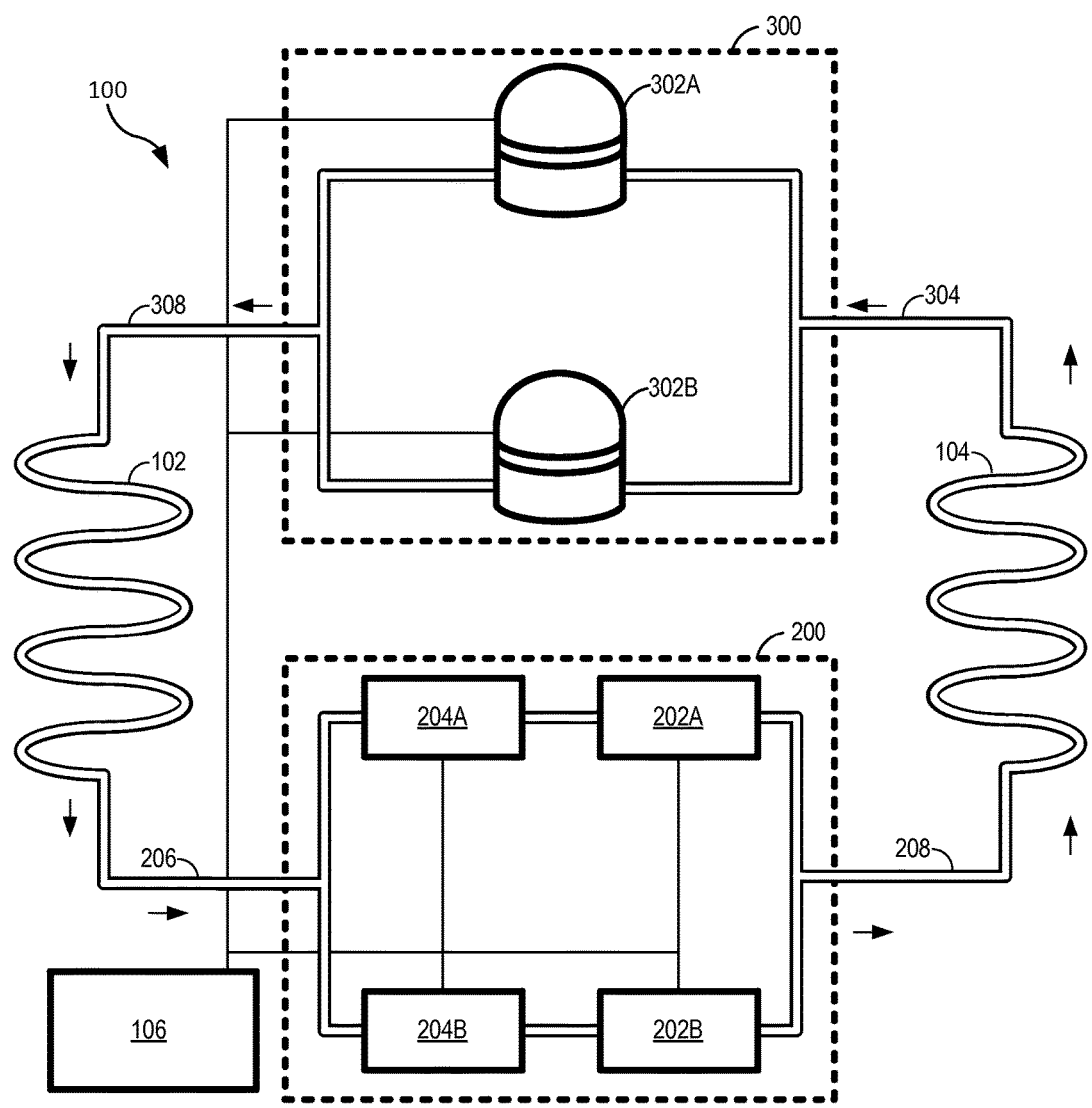
FIG. 1 is a block diagram showing components of an HVAC system 100.

FIG. 1 is a block diagram showing components of the HVAC system 100. The HVAC system 100 may include a condenser 102, an evaporator 104, a controller 106, a metering section 200, and a compressor section 300. During system operation, refrigerant may flow from one component to the next in the direction indicated by the arrows of FIG. 1. The HVAC system 100 may supply conditioned air to a space. In an alternative embodiment, the HVAC system 100 may include additional, fewer or different components than those shown in FIG. 1.

The HVAC system 100 may provide conditioned supply air for heating, cooling, or ventilating a space using any combination of HVAC components and control methods comprising the prior art. In an embodiment, the HVAC system 100 may be any type of HVAC system, including a heat pump, a variable refrigerant flow system, a split system, and the like. The HVAC system 100 may be used in residential and commercial buildings, and in refrigeration. The HVAC system 100 is not necessarily capable of all of heating, ventilation, and air conditioning.

The HVAC system 100 may include the condenser 102. The condenser 102 may allow for heat transfer between HVAC system 100 refrigerant and the outdoor air. The condenser 102 may be a heat exchanger of any known type used in HVAC systems. In an embodiment, the HVAC system 100 may be provided with one or more condenser 102. The design, operation, and features of condensers are known to those skilled in the relevant art and discussion of each is omitted from this description.

The HVAC system 100 may include the evaporator coil 104. The evaporator coil 104 may allow for heat transfer between HVAC system 100 refrigerant and return air from a conditioned space and/or outdoor ventilation air. The evaporator coil 104 may be a heat exchanger of any known type used in HVAC systems. In an embodiment, the HVAC system 100 may be provided with one or more evaporator coils 104. The design, operation, and features of evaporator coils are known to those skilled in the relevant art and discussion of each is omitted from this description.

The HVAC system 100 may include the controller 106 for controlling the HVAC system 100 components in response to user input, demands of the conditioned space, sensed operating conditions, logic that may be stored within the controller 106, and the like. The controller 106 may be connected to the HVAC system 100 components via a wired or wireless connection. The controller 106 may energize, de-energize, and/or configure the HVAC system 100 components. The controller 106 may be a separate component within the HVAC system 100 or may, alternatively, be incorporated into a thermostat located within the conditioned space. The controller 106 may be implemented with a memory and a processor for storing and executing logic for controlling the HVAC system 100. The controller 106 may be implemented with hardware, software, or firmware.

The controller 106 may be provided with a volatile or non-volatile memory of any known type commonly used in HVAC systems. The controller 106 may store computer executable instructions within a memory and may be provided with a processor for executing stored computer executable instructions. The computer executable instructions may be included in computer code.

The controller 106 may be provided with a processor of any known type commonly used in HVAC systems. The processor may be a single device or combinations of devices, such as associated with a network or distributed processing. The controller 106 may be responsive to or operable to execute instructions stored as part of software, hardware, integrated circuits, firmware, micro-code or the like. The functions, acts, methods or tasks performed by the controller 106, as described herein, may be performed by a processor executing instructions stored in a memory. The instructions are for implementing the processes, techniques, methods, or acts described herein.

The controller 106 may store one or more predefined functions that may be used to control the operation of one or more components of the HVAC system 100. For example, the controller 106 may store predefined functions defining control of compressors, metering devices, valves, and the like. Input to the predefined functions may be some combination of measured values, sensed values, user input, a demand on the system, and the like. An output of one or more predefined functions may be a desired setting of a component of the HVAC system 100, such as the position of a valve, for example.

Figure 3:
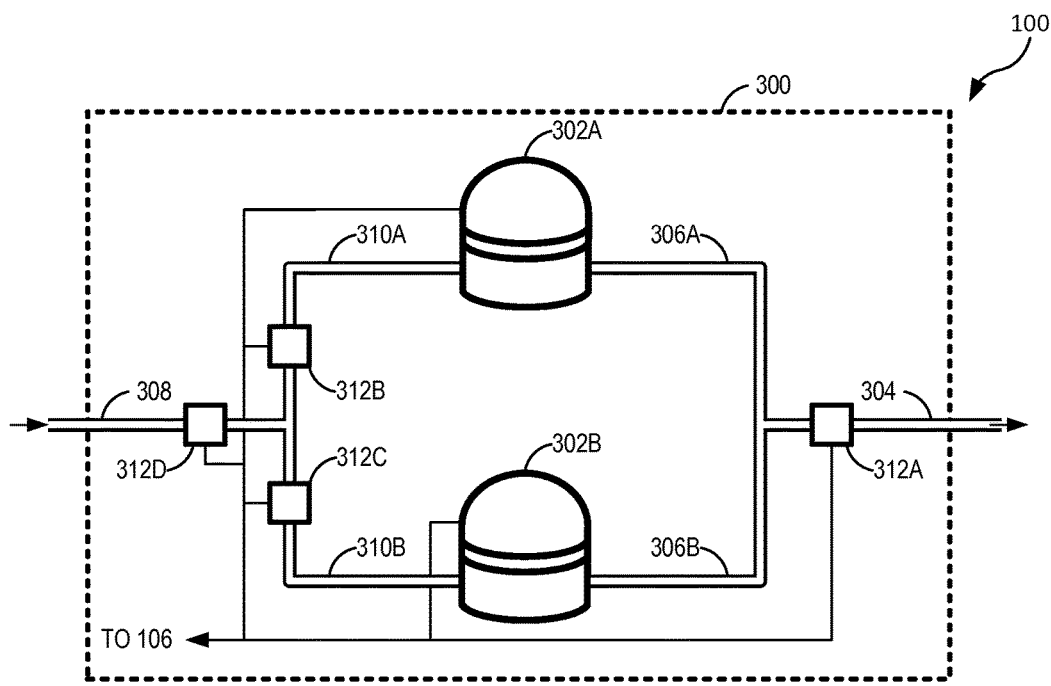
FIG. 3 is a block diagram of one embodiment of the compressor section 300 components of the HVAC system 100.

In an embodiment, the controller 106 may be implemented with logic for comparing received data that may be sensed, or calculated, from one or more sensing devices 312, as shown in FIG. 3 and as described below, to tolerance values that may be stored within the controller 106 memory defining safe operating conditions for the HVAC system 100. Based on the outcome of the comparison of received data from one or more of the sensing devices 312, the controller 106 may be implemented with logic for reconfiguring components of the HVAC system 100, such as setting the position of one, or more, valves. The controller 106 may receive data which may comprise signals from one or more remote devices, such as the sensing devices 312, described below. The data received by the controller 106 may be received directly from one or more remote devices or may be received indirectly through one or more intermediate devices, such as a signal converter, a processor, an input/output interface, an amplifier, a conditioning circuit, a connector, and the like The controller 106 may energize, de-energize, or configure components of the HVAC system 100 to meet the demands of the conditioned space. The controller 106 and system components may be configured to meet demands less than the full load capacity of the HVAC system 100 by only energizing, or configuring, selected components, while leaving other components de-energized. Specifically, the compressors may be configured such that only one, both, or neither are operating, depending on the demands of the conditioned space. The controller 106 may be further configured to selectively energize other system components such as valves controlling the routing of refrigerant through the HVAC system 100, as described below, based on system demand.

The controller 106 may control the HVAC system 100 according to the heating, cooling, and air quality, among other demands of the conditioned space. The possible levels of demand may be called "O," "Y1," and "Y2." An "O" demand may signify the conditioned space does not require heating or cooling. The controller 106 may respond to an "O" demand by de-energizing the compressors. A "Y1" demand may signify the conditioned space requires a first stage of heating or cooling that is less than the full capacity of the HVAC system 100. The controller 106 may respond to a "Y1" demand by energizing one or more compressors 302 in the system while leaving one or more compressors 302 de-energized in the system, or, alternatively, by operating one or more compressors at a speed setting below the full capacity speed setting. A "Y2" demand may signify the conditioned space requires a second stage of heating or cooling.

The controller 106 may respond to a "Y2" demand by causing all compressors to operate at their respective full capacity speed settings.

The controller 106 may further respond to the possible levels of demand on the HVAC system 100 by selectively energizing, de-energizing, or setting the position of one or more valves for controlling the routing of refrigerant flow through the HVAC system 100. For example, in an HVAC system provided with more than one metering device, which may be thermal expansion valves (TXVs), the controller may be configured to open, or close, one or more valves, which may be solenoid valves, to selectively route the refrigerant flow of the HVAC system through only one of the TXVs of the HVAC system.

In such a system, the controller 106 may respond to an "O" demand on the HVAC system 100 by closing all of the solenoid valves of the HVAC system 100, allowing no refrigerant flow to reach any of the TXVs of the system. The controller 106 may respond to a "Y1" demand by opening one or more solenoid valves while leaving one or more other solenoid valves closed, for routing the refrigerant flow though only the desired TXV, which may, in an embodiment, be a lower capacity TXV, configured to optimize the HVAC system 100 operation in response to partial load demand. The controller 106 may respond to a "Y2" demand by opening one or more solenoid valves while leaving one or more other solenoid valves closed, for routing the refrigerant flow though only the desired TXV, which may be a higher capacity TXV configured to optimize the HVAC system 100 operation in response to full load demand.

Figure 2:
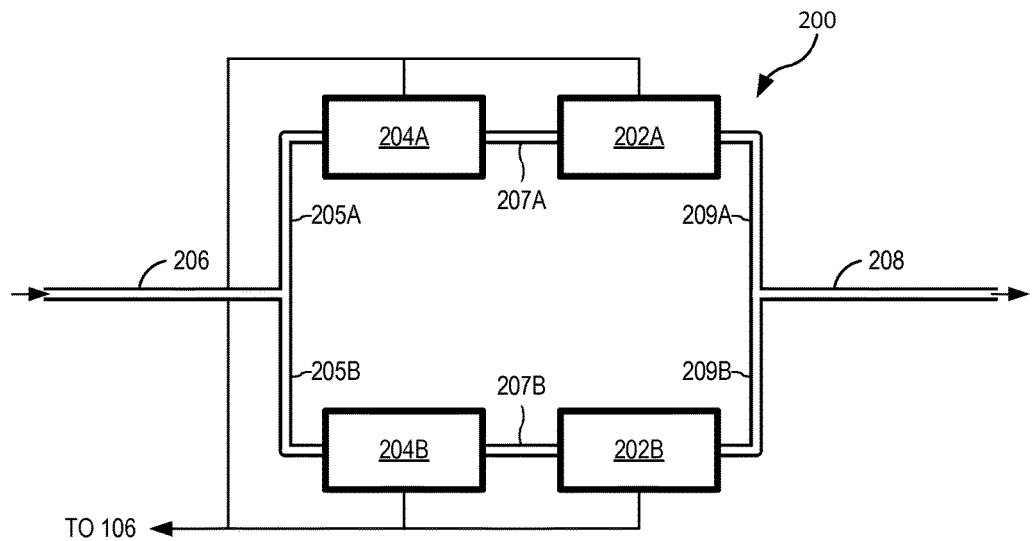
FIG. 2 is a block diagram of one embodiment of the metering section 200 components of the HVAC system 100.

Referring now to FIG. 2, the metering section 200 of the HVAC system 100 is shown. The metering section 200 may include the metering devices 202A and 202B and the valves 204A and 204B. In an alternative embodiment, additional, or fewer, metering devices 202 and/or valves 204 may be provided.

The metering section 200 may be positioned within the HVAC system 100 between the condenser 102 and the evaporator 104, as part of a vapor compression cycle. Refrigerant may flow through the metering section 200 from the condenser 102 side to the evaporator 104 side along one, or both, of two paths. The high pressure liquid line 206 may connect the condenser 102 and the metering section 200 components. The low pressure liquid line 208 may connect the metering section 200 components to the evaporator 104 as shown in FIGS. 1 and 2. Although a single metering components section 200 is shown, more than one metering components section 200 may be included in an HVAC system 100, such as for multi-stage HVAC systems, heat pump HVAC systems, VRF systems, and the like.

As shown in FIG. 2, the metering section 200 may comprise of two paths of refrigerant piping. Each path through the metering section 200 may connect the high pressure liquid line 206 to the low pressure liquid line 208, routing refrigerant through one or more throttling components. Each path may comprise a high pressure leg 205, a connector leg 207, and a low pressure leg 209. The high pressure legs 205A, B may branch off from the high pressure liquid line 206 and route refrigerant to the valves 204A, B, respectively. The connector legs 207A, B may route refrigerant from the valves 204A, B to the metering devices 202A, B, respectively. The low pressure legs 209A, B may merge to form the low pressure liquid line 208 and may route refrigerant from the metering devices 202A, B into the low pressure liquid line 208. In alternative embodiments, additional, fewer, or different piping sections may be included for routing refrigerant through the metering section 200 of the HVAC system 100.

Referring to FIG. 2, the metering devices 202A and 202B may control the rate of refrigerant flow passing from the condenser 102 to the evaporator 104 of the HVAC system 100, throttling the refrigerant flow to induce a drop in refrigerant pressure across the metering device. The metering devices 202A and 202B may be any type of metering device known in the prior art, such as TXVs, short orifices, electronic expansion valves (EXVs), and the like. In an embodiment, the metering devices 202A, B may be operably coupled to the controller 106 via wired or wireless connections. In such embodiments, the controller 106 may control the settings of the metering devices 202A, B in response to operating conditions of the HVAC system 100. The operation of these metering devices is well known to those of ordinary skill in the art and is, thus, excluded from this description.

The metering devices 202A and 202B may be configured to differ in capacity from one another, with each metering device, 202A and 202B, sized to permit a different flowrate of refrigerant to pass through it. In an embodiment, the metering devices 202A and 202B may be sized such that a first metering device, 202A, for example, permits a flowrate matching the full load capacity of the HVAC system 100. The second metering device, 202B, for example, may be sized to permit refrigerant to pass through it at a lower flow rate that matches part load operation of the HVAC system 100. In this arrangement, metering device 202A may be described as the "full load" metering device and metering device 202B may be described as the "part load" metering device. Alternatively, metering devices 202A and 202B may be sized to collectively permit refrigerant flow to pass through them at a flowrate that matches full load operation of the HVAC system 100.

The metering section 200 may include two valves, 204A and 204B, as shown in FIG. 2. The valves 204A and 204B may be controlled by the controller 106 for selecting the path of refrigerant flow through the metering section 200 of HVAC system 100, directing the refrigerant flow through one, or both, from among the metering devices 202A and 202B.

The valves 204A and 204B may be solenoids, check valves, flow control valves, three-way valves, four way valves, or the like. In an embodiment, the valves 204A and 204B may be configured for normally-closed operation, preventing the flow of refrigerant through the valves 204A and 204B unless the valves 204A and 204B are energized. Advantageously, normally-closed valves may allow the controller 106 to de-energize the valves 204A and 204B during non-operating time, closing the valves while avoiding potentially overheating of the valves 204A and 204B, as may be the case for valves configured to be in the normally-open position. Further, those skilled in the relevant art will appreciate that valves configured for normally-closed operation may provide the additional benefit of having a less harmful failure mode than valves configured for normally open operation when used as shown in FIGS. 1-3, and as described herein.

The HVAC system 100 may include a compressor section 300 for compressing refrigerant as part of a vapor compression cycle. The compressors may be compressors of any type comprising the prior art, such as reciprocating compressors, scroll compressors, and the like. The compressors may be single speed or variable speed compressors.

The compressor section 300 may include one or more compressors which may be configured to operate independently, with each compressor being a part of a unique refrigerant piping loop of vapor compression cycle components. Alternatively, as shown in the embodiment of FIG. 3, the compressors may be configured as tandem compressors, with more than one compressor incorporated into a single refrigerant piping loop.

Further, and regardless of whether the compressors of compressor section 300 are configured to operate independently or in tandem, the compressors may be configured for both full and part load operation. During part load operation one, or more, compressors may be operated while one, or more, other compressors, if provided, are not operated. Alternatively, some, or all compressors of the compressor section 300 may be configured to operate at less than their respective full capacities during partial load operation. During full load operation, all compressors provided may be operated at their full capacities.

As shown in the embodiment of FIG. 3, the HVAC system 100 may be provided with two compressors, the compressors 302A and 302B, configured for tandem operation. The compressors 302A and 302B may share common piping for refrigerant flow through the HVAC system 100, such as a common suction line 304 and a common discharge line 308. The compressor section 300 may also include some, all, or none of the sensors 312A-D shown.

The compressors 302A and 302B may have "merged piping," meaning compressors 302A and 302B may share the common suction line 304 and the common discharge line 308. The common suction line 304 may separate into split suction lines 306A and 306B. The common discharge line 308 may be formed from the merging of the split discharge lines 310A and 310B.

The compressor 302A may have suction port where it receives refrigerant from the split suction line 306A. The compressor 302A may compress the refrigerant and discharge it through a discharge port into the split discharge line 310A. The compressor 302B may have suction port where it receives refrigerant from the split suction line 306B. The compressor 302B may compress the refrigerant and discharge it through a discharge port into the split discharge line 310B. The split discharge lines 310A and 310B may combine into the common discharge line 308.

The compressors 302A and 302B may be part of a vapor compression cycle. The compressors 302A and 302B may receive refrigerant from the common suction line 304. During the HVAC system 100 operation, one, or both, of compressors 302A and 302B may compress refrigerant received from the common suction line 304 and discharge the pressurized refrigerant through the common discharge line 308. The common discharge line 308 may route the pressurized refrigerant to the condenser 102. From the condenser 102, the refrigerant may be routed through the metering section 200 to the evaporator 104, before returning to one or more of the compressors 302A and 302B via the common suction line 304.

In some embodiments, the compressor section 300 may be further provided with one or more sensing devices 312 for detecting HVAC system 100 operating conditions, such as the refrigerant pressure or temperature. Additionally, or alternatively, the sensing devices 312 may be configured to detect temperature, humidity, flow rate, or other similar measurable characteristic of the ambient outdoor air, the indoor air, the return air, or the supply air by any known method. The sensing devices 312 may be thermistors, transducers, pressure switches, temperature switches, and the like.

Each sensing device 312 may be operably connected to the controller 106 via a wired or wireless connection and may communicate sensed data to the controller 106. In an embodiment, the sensing devices 312 may transmit analog or pneumatic signals either directly, or indirectly, to the controller 106. In such an embodiment, the signals transmitted by the sensing devices 312 may be converted to digital signals prior to use by the controller 106. Alternatively, in an embodiment, the sensing devices 312 may transmit digital signals to the controller 106. In such an embodiment, the digital signals transmitted by the sensing devices 312 may be processed prior to use by the controller 106 to convert the signals to a different voltage, to remove interference from the circuits, to amplify the signals, or other similar forms of digital signal processing. For each alternative described, herein, the signals of the sensing devices 312 may be transmitted to the controller 106 directly or indirectly, such as through one or more intermediary devices.

The number, and location, of the sensing devices 312 may differ from that shown in the embodiment of FIG. 3, in accordance with known methods of refrigerant and air pressure and temperature sensing and HVAC system performance monitoring and in accordance with design considerations such as system performance, efficiency, reliability, cost, and the like. In alternative embodiments, additional, fewer, or different sensing devices 312 may be provided.

Further, although not shown in the embodiment of FIGS. 1-3, in alternative embodiments, the HVAC system 100 may be provided with additional sensing devices 312 disposed in other sections of the HVAC system 100, such as at the condenser 102, at the evaporator 104, in the metering section 200, in the conditioned space, and the like. It will also be appreciated by those skilled in the relevant art that some of the control methods described herein will not require that the HVAC system be implemented with any of the sensing devices 312 while other control methods may require that the HVAC system 100 be provided with one, or more, of the sensing devices 312 as shown or described, herein.

In the embodiment shown in FIG. 3, four sensing devices 312A-D may be provided. The sensing device 312A may be a pressure transducer disposed on the common suction line 304 for sensing the suction pressure of the refrigerant entering the compressor section 300. The sensing devices 312B and 312C may be thermistors, with each disposed on one of the split discharge legs 310A or 310B, for sensing the refrigerant temperature at the discharge of the compressors 302A and 302B. The sensing device 312D may be a high pressure switch disposed on the common discharge line 308, configured to interrupt compressor 302A and/or 302B operation if an over-tolerance refrigerant discharge pressure is detected.

Referring to the embodiment shown in FIGS. 1-3, as described above, the HVAC system 100 may be provided with one or more sets of alternate refrigerant flow paths formed from sections of refrigerant piping in which a single, common, pipe splits out into two legs of piping. As shown in FIGS. 1 and 3, for example, the HVAC system 100 may be provided with refrigerant piping forming a pair of divergent paths for providing refrigerant flow from the common suction line 304 to the compressors 302A and 302B of the compressor section 300. Additionally, as shown in the embodiment of FIGS. 1 and 2, the HVAC system 100 may be provided with refrigerant piping forming a pair of divergent paths for providing refrigerant flow from the high pressure liquid line 206 to the metering devices 202A and 202B in the metering section 200.

In alternative embodiments, the refrigerant piping configuration may include more, or fewer, sections of piping in which a single pipe splits out into two, or more, divergent paths for refrigerant flow through the HVAC system 100. For example, the HVAC system 100 may be provided with more than one condenser 102 and/or evaporator 104, with each among the multiple components provided with a separate leg of refrigerant piping split off from a common refrigerant pipe.

In the embodiment of FIG. 1, as well as in any of the alternative embodiments contemplated herein, valves, such as the valves 204A and 204B, may be provided for some, or all, of the divergent legs of refrigerant piping of an HVAC system 100. The valves may provide a means of refrigerant flow path control for the HVAC system 100, with the controller 106 selectively opening and closing one, or more, valves to configure the HVAC system 100 for specific operating modes, or to "tune" the HVAC system 100 to match the demand on the HVAC system by including, or removing, components from the refrigerant flow path.

Referring now to the specific embodiment of FIGS. 1-3, the portion of the HVAC system 100 extending from the discharge of the compressors 302A and 302B to the inlet of the metering devices 202A and 202B of the metering section 200, respectively, may comprise the high pressure side of the HVAC system 100. The portion of the HVAC system 100 extending from the outlet of the metering devices 202A and 202B of the metering section 200 to the inlet at the compressors 302A and 302B, respectively, from the common suction line 304 may comprise the low pressure side of the HVAC system 100. Operation of the HVAC system 100 in any operational mode in which one, or more, of the compressors 302A and 302B are energized may create a large pressure differential across the HVAC system 100, with the high pressure side of the HVAC system 100 containing compressed refrigerant at a high pressure and the low pressure side of the HVAC system 100 containing refrigerant at a lower pressure.

In an embodiment, as described above, the controller 106 may control the valves 204A and 204B to direct the path of refrigerant flow from the condenser 102 through the desired metering device, 202A or 202B, depending on the capacity at which the HVAC system 100 is operating. More specifically, during part load operation, the controller 106 may open the valve 204B and close the valve 204A, directing all of the refrigerant flow through the "part load" metering device, which may be the metering device 202B. During full load operation, the controller 106 may open the valve 204A and close the valve 204B, directing all of the refrigerant flow through the "full load" metering device, which may be the metering device 202A. In this manner the controller 106 may "tune" the HVAC system 100 to match operating conditions through selection of the metering device that is sized to match system demand, improving overall HVAC system efficiency.

The use of valves 204A and 204B to control the path of refrigerant flow through one of multiple metering devices 202A or 202B may cause unsafe conditions within the HVAC system 100 that can affect compressor 302A and 302B reliability. During system non-operating time, with both valves 204A and 204B in the closed position, there may be no path through which the pressure differential that builds up across the high pressure and low pressure sides of the HVAC system 100 can dissipate.

A pressure differential across the HVAC system 100 may be caused by prior HVAC system 100 operation or by charging the HVAC system 100 with refrigerant, either at installation or during field maintenance. Starting the compressor, or compressors, 302 while this pressure differential exists between the high and low pressure sides of the HVAC system 100 can cause damage to the compressor, or compressors, 302. Additionally, startup at times when a large pressure differential exists across the HVAC system 100 may cause system alarms as well as one, or more, pressure switches to trip, causing power interruption and power cycling to the compressor, or compressors 302.

It will be appreciated by those skilled in the art that the control methods described below, may be utilized in any HVAC system provided with valves, which may be normally-closed solenoid valves, for controlling the routing of refrigerant through multiple, alternative, legs of refrigerant piping, regardless of the particular system component, or components, the multiple legs of refrigerant piping are directed towards, or from.

Figure 4:
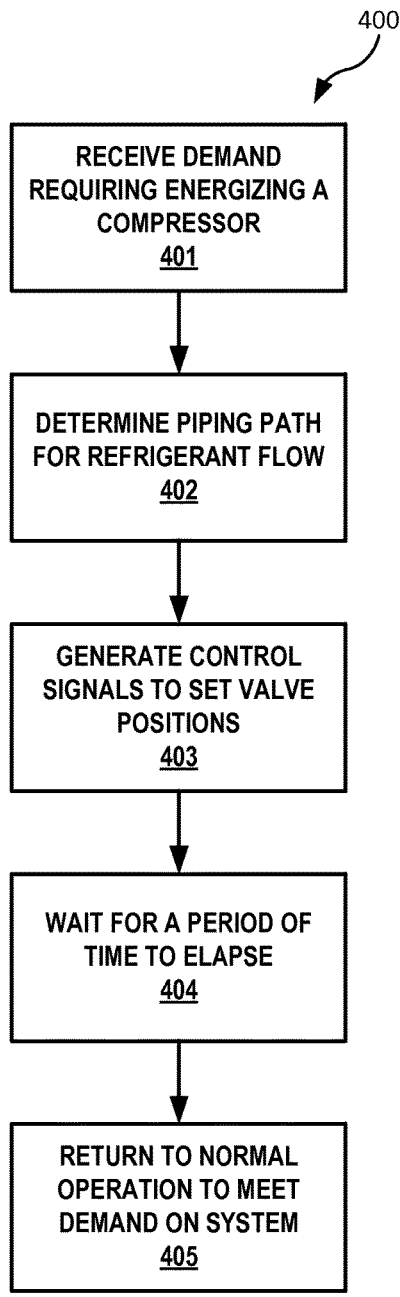
FIG. 4 is a flowchart of a first method 400 of control of the HVAC system 100 to allow for pressure dissipation across the HVAC system 100.

Referring to FIG. 4, a first method 400 for allowing a refrigerant pressure difference across the HVAC system 100 to dissipate following a period of time in which all compressors 302 are de-energized is shown. In an embodiment, fewer or additional steps may be included. The controller 106 may perform the first method 400.

At step 401, the controller 106 may receive a demand upon the HVAC system 100 that requires the operation of one, or more, compressors 302 following a period in which no compressors 302 were operating. The demand may be for heating, cooling, or any other operation of the HVAC system 100 that requires compressor operation. The demand may be a "Y2" demand placed upon the HVAC system 100 following a period of "O" demand. Alternatively, the demand may be a "Y1" demand upon the HVAC system 100 following a period of "O" demand.

Note, however, that the first method 400 may not be executed in instances where the HVAC system 100 demand is a "Y2" demand and the HVAC system was operating in response to a "Y1" demand immediately prior to receiving the "Y2" demand. Similarly, the first method 400 may not be executed in instances where the HVAC system 100 demand is a "Y1" demand and the HVAC system 100 was operating in response to a "Y2" demand immediately prior to receiving the "Y1" demand. In both instances, one, or more, compressors 302 are operating at the time that the new demand is received and one valve, 204A or 204B, is already open. The first method 400 is not applicable to these situations.

At step 402, the controller 106 may select a piping path, or paths, through the metering section 200 for use in reducing a refrigerant pressure difference across the metering section 200 of the HVAC system 100. According to the embodiment of FIG. 2, a piping path may comprise of several piping sections, including the high pressure leg 205A, the connector leg 207A, the low pressure leg 209A, in addition to the valve 204A and metering device 202A. In alternative embodiments, fewer piping sections and/or components may comprise a piping path through the metering section 200.

The controller 106 may select the piping path, or paths, to be used in response to a demand placed on the HVAC system 100, selecting a path which may include the metering device, 202A or 202B having a capacity which more closely matches the demand placed upon the HVAC system 100. If the demand placed upon the HVAC system is at, or near, the full capacity of the HVAC system 100, the controller 106 may select a piping path including the metering device, 202A or 202B, configured for higher capacity operation. If the HVAC system 100 is responding to a lower demand, the controller 106 may select a piping path including the metering device, 202A or 202B, configured for lower capacity operation.

At step 403, the controller 106 may generate one, or more, control signals opening the valves, 204A and/or 204B, disposed along the selected piping path, or paths. For example, if the controller 106 received a demand requiring partial load operation of the HVAC system 100, the controller 106 may select a piping path including the lower capacity, "part load," metering device, which may be the metering device 202B, at step 402. The controller may, then, generate a control signal opening the valve 204B at step 403 creating a path for refrigerant to flow through the metering section 200 to reduce a refrigerant pressure difference within the HVAC system 100. Alternatively, for example, if the controller 106 received a demand requiring full load operation of the HVAC system 100, the controller 106 may select a piping path which includes the higher capacity, "full load," metering device, 202A at step 402. The controller may generate a control signal for opening the corresponding valve, the valve 204A at step 403.

At the step 404, the controller 106 may maintain the valves 204A, B at the positions set by the control signal generated at the step 403 until a period of time elapses. The period of time may be an amount of time sufficient for the refrigerant pressure difference to be reduced to below a tolerance value. The tolerance value may represent a maximum refrigerant pressure difference within the HVAC system 100 at which a de-energized compressor 302 may be energized safely. In an embodiment, for example, the amount of time may be a predefined period of time of about five minutes. Alternatively, the predefined period of time may be between about 60 and 510 seconds.

Following the elapsing of the period of time at the step 404, the controller 106 may return the HVAC system 100 to normal operation. The controller 106 may, at the step 405 generate one or more control signals for setting the positions of one, or both, of the valves 204A and/or 204B to configure the valves 204A, B for operation of the HVAC system 100 to meet a demand requiring energizing of one, or more, compressors 302A, B.

Figure 5:
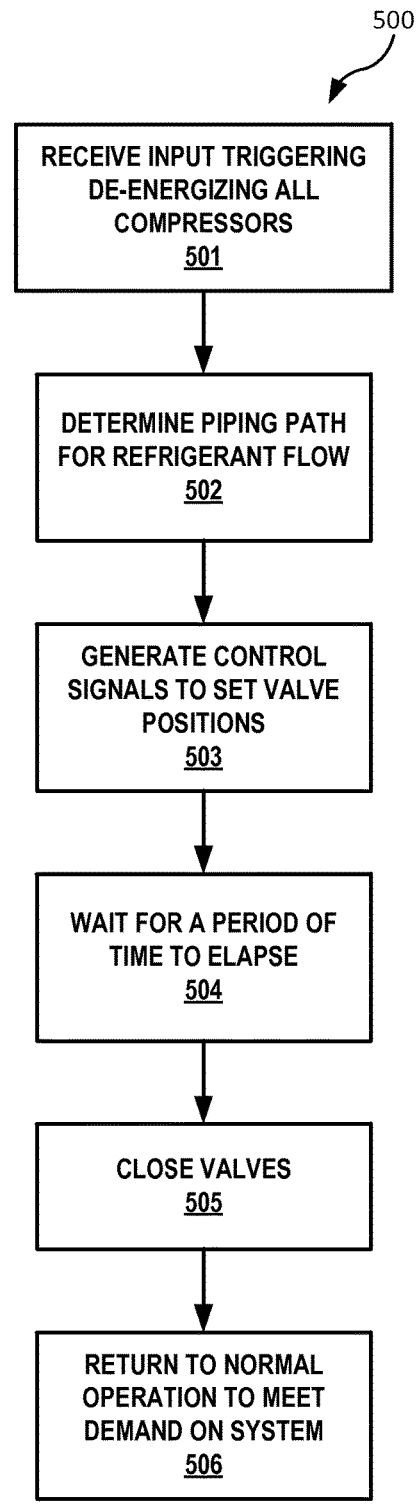
FIG. 5 is a flowchart of a second method 500 of control of the HVAC system 100 to allow for pressure dissipation across the HVAC system 100.

Referring now to FIG. 5, a second method 500 is shown for reducing a refrigerant pressure difference within the HVAC system 100 at the end of a demand on the HVAC system which required energizing of at least one compressor 302A, B. The controller 106 may perform the second method 500.

At step 501, the controller 106 may receive a triggering input, such as a signal indicating an "O" demand upon the HVAC system 100 which follows a period of either "Y1" or "Y2" demand. The controller may de-energize the compressors 302 in response to receiving the triggering input. The HVAC system 100 may have been operating in response to a "Y1" or "Y2" demand for heating, cooling, or any other operation of the HVAC system 100 that requires compressor 302 operation prior to the controller 106 sensing a "O" demand. Note that the second method 500 is inapplicable to situations in which the demand on the HVAC system 100 changes from "Y2" to "Y1" or from "Y1" to "Y2" since at least one compressor would be operating in these instances and one of the valves 204 would be energized and open.

At step 502, the controller 106 may select a piping path, or paths, through the metering section 200 for use in reducing a refrigerant pressure difference within the HVAC system 100. According to the embodiment of FIG. 2, a piping path may comprise of several piping sections, including the high pressure leg 205A, the connector leg 207A, the low pressure leg 209A, in addition to the valve 204A and metering device 202A. In alternative embodiments, fewer piping sections and/or components may comprise a piping path through the metering section 200.

The controller 106 may select a piping path, or paths, which include the valve, or valves, 204A, B which may have been in the open position at the commencement of execution of the second method 500. For example, if the valve 204A was open at the commencement of the second method 500 as part of the normal operation of the HVAC system 100 in meeting a prior demand, the controller 106 may select a piping path including the valve 204A at the step 502. In an embodiment, the controller 106 may configure the HVAC system at step 503, described below, by simply leaving the valves 204A, B in the positions each was in at the commencement of execution of the second method 500.

For example, if the HVAC system 100 was operating in response to a "Y1" demand with the "part load" valve, 204B, for example, energized and open while the "full load" valve, 204A, for example, is de-energized and closed prior to receiving the "O" demand at step 501, the controller 106 may configure the valves 204 at step 502 by leaving the valves 204 in their present configuration. Similarly, if the HVAC system 100 was operating in response to a "Y2" demand with the "full load" valve, 204A, for example, energized and open while the "part load" valve, 204B, for example, is de-energized and closed prior to receiving the "O" demand at step 501, the controller 106 may configure the valves 204 at step 502 by leaving the valves 204 in their present configuration.

Alternatively, the controller 106 may be configured to always select a particular piping path, or paths, at the step 502, regardless of the positions of the valves 204A, B at the commencement of execution of the second method 500. In such embodiments, the controller 106 may be configured to open the valve, or valves, 204A and/or 204B at step 502, corresponding to a "default" piping path, or paths, regardless of the configuration of the valves 204A, B at the commencement of the second method 500. In this instance, the controller 106 may be configured to always open the "full load" valve, for example, at step 502, regardless of whether the controller 106 is responding to a "Y1" to "0" or "Y2" to "O" demand change at the step 501. Advantageously, opening the "full load" valve at step 502 may allow for faster dissipation of the pressure differential across the HVAC system 100.

At step 503, the controller 106 may generate one, or more, control signals opening the valves, 204A and/or 204B, disposed along the selected piping path, or paths. At the step 504, the controller 106 may maintain the valves 204A, B at the positions set by the control signal generated at the step 503 until a period of time elapses. The period of time may be an amount of time sufficient for the refrigerant pressure difference to be reduced to below a tolerance value. The tolerance value may represent a maximum refrigerant pressure difference within the HVAC system 100 at which a de-energized compressor 302 may be energized safely. In an embodiment, for example, the amount of time may be a predefined period of time of about five minutes. Alternatively, the predefined period of time may be between about 60 and 510 seconds. In some embodiments, this period of time may be, but is not necessarily, as long as thirty minutes.

At step 505, the controller 106 may generate a control signal closing the open valve, or valves, 204A and/or 204B. Closing the valves, 204A and/or 204B, at the step 505 may reduce the risk of the valves 204A, B overheating during the HVAC system 100 down time. Alternatively, in an embodiment, if during execution of the second method 500 a demand is placed upon the HVAC system 100 requiring energizing of one or more compressors 302A, B, the controller 106 may bypass the step 505. The controller 106 may proceed to the step 506 and may return the HVAC system 100 to normal operation in a manner similar to that described, above, regarding the step 405 of the first method 400. If no demand is placed on the HVAC system 100, the controller 106 may generate control signals for closing the valve, or valves, 204A and/or 204B opened at the step 503 prior to returning the HVAC system 100 to normal operation at the step 506.

Figure 6:
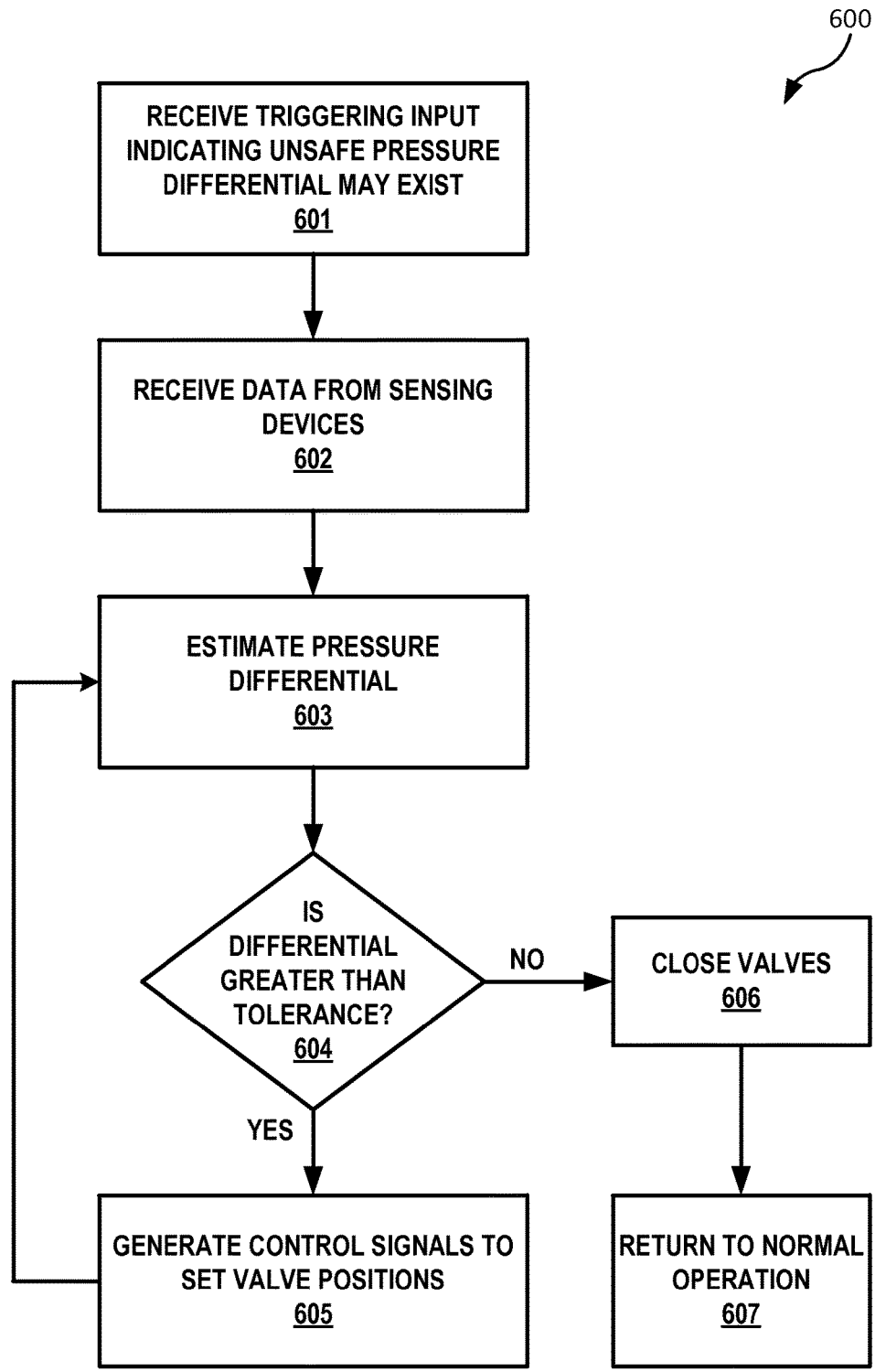
FIG. 6 is a flowchart of a third method 600 of control of the HVAC system 100 to allow for pressure dissipation across the HVAC system 100.

Referring now to FIG. 6, a third method 600 for reducing a refrigerant pressure difference within the HVAC system 100 is shown. The controller 106 may perform the third method 600. In an embodiment, the controller 106 may be configured to initiate the third method 600 at power on of the HVAC system 100, continuously monitoring the HVAC system according to the third method 600 during all HVAC system 100 down time.

At step 601, the controller 106 may receive a triggering input indicating an unsafe refrigerant pressure difference may exist within the HVAC system 100. The triggering input may be a demand upon the HVAC system 100 requiring the operation of one, or more, compressors 302 following a period in which no compressors 302 were operating, the initial powering on of the HVAC system 100, an end of demand upon the HVAC system 100 which was preceded by a period of either "Y1" or "Y2" demand, or detection of an over tolerance refrigerant pressure difference within the HVAC system 100 during non-operating time of the HVAC system 100.

At step 602, the controller may receive data from one or more sensing devices 312A-D. In an embodiment, the received data may be temperature or pressure data for refrigerant in the HVAC system 100. Additionally, or alternatively, the received data may be temperature, humidity, flow rate, or other similar measurable characteristic of the ambient outdoor air, the indoor air, the return air, or the supply air.

At step 603, the controller may estimate the pressure differential between the high pressure and low pressure sides of the HVAC system using the received data from one or more sensing devices 312 along with known methods of calculating refrigerant pressure. The estimated refrigerant pressure difference may be compared to a tolerance value at step 604.

An HVAC system 100 provided with a pressure transducer disposed on the common suction line 304 and a thermistor configured to sense the air temperature of the conditioned space, and implemented the third method 600, for example, may perform the following functions at steps 602 through 604. The controller 106 may use the sensed suction pressure in combination with known characteristics of the particular refrigerant utilized by the HVAC system 100 to calculate a saturation temperature of the refrigerant. The saturation temperature may then be used along with the indoor return air temperature to calculate the percentage temperature difference between the two. The percentage temperature difference may be compared to a tolerance value at step 604. The tolerance value may be 20%, for example.

If the estimated value is found to be greater than the tolerance value, the controller 106 may generate control signals for opening the valve, or valves, 204A and/or 204B, at step 605 to allow a path for dissipation of the pressure differential across the HVAC system 100. The particular valve, or valves, 204A and/or 204B, opened at the step 605 may depend on the particular triggering input initiating execution of the third method 600. A piping path may be selected by the controller 106 in a manner similar to those discussed in reference to the step 402 of the first method 400 or the step 502 of the second method 500, as described above. The controller 106 may monitor the estimated pressure differential by repeating the steps 603-605 until the estimated pressure differential is determined to have been reduced to below a tolerance value at the step 604.

Upon the estimated pressure differential reducing to below the tolerance value at the step 604 the controller may generate a control signal for closing the valve, or valves 204A and/or 204B opened at the step 605. Closing the valves, 204A and/or 204B, at the step 606 may reduce the risk of the valves 204A, B overheating during the HVAC system 100 down time. Alternatively, in an embodiment, if during execution of the third method 600 a demand is placed upon the HVAC system 100 requiring energizing of one or more compressors 302A, B, the controller 106 may bypass the step 606. The controller 106 may proceed to the step 607 and may return the HVAC system 100 to normal operation in a manner similar to that described, above, regarding the step 405 of the first method 400 to meet the demand. If no demand is placed on the HVAC system 100, the controller 106 may generate control signals for closing the valve, or valves, 204A and/or 204B opened at the step 605 and return the HVAC system 100 to normal operation at the step 607.

In some embodiments, the controller 106 may be configured to continuously monitor the HVAC system during non-operating time of the HVAC system 100 for triggering inputs initiating execution of the third method 600. Alternatively, the controller 106 may be configured to wait a predefined amount of time before monitoring the HVAC system 100 for an over tolerance refrigerant pressure difference within the HVAC system 100.

In the preceding discussion, numerous specific details are set forth to provide a thorough explanation. However, such specific details are not essential. In other instances, well known elements have been illustrated in schematic or block diagram form. Additionally, for the most part, specific details within the understanding of persons of ordinary skill in the relevant art have been omitted.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of other features. Many such variations and modifications may be considered desirable by those skilled in the art based upon a review of the foregoing description of preferred embodiments.

The invention claimed is:

1. An apparatus for reducing a refrigerant pressure difference within an HVAC system during non-operating time of the HVAC system, the apparatus comprising:
   a compressor section comprising one or more compressors, each compressor receiving low pressure refrigerant from a first heat exchanger through a common suction pipe and discharging high pressure refrigerant to a second heat exchanger through a common discharge pipe during operating time of the HVAC system;
   a metering section receiving high pressure refrigerant from the second heat exchanger from a common high pressure pipe and discharging low pressure refrigerant to the first heat exchanger through a common low pressure pipe, the metering section comprising:
   a first pipe coupled to the common high pressure pipe at a first inlet and coupled to the common low pressure pipe at a first outlet;
   a first valve coupled to the first pipe, the first valve permitting refrigerant flow through the first pipe when open, and the first valve preventing refrigerant flow through the first pipe when closed;
   a first metering device coupled to the first pipe, the first metering device throttling flow of refrigerant through the first pipe;
   a second pipe coupled the common high pressure pipe at a second inlet and coupled to the common low pressure pipe at a second outlet;
   a second valve coupled to the second pipe, the second valve permitting refrigerant flow through the second pipe when open, and the second valve preventing refrigerant flow through the second pipe when closed; and
   a second metering device coupled to the second pipe, the second metering device throttling flow of refrigerant through the second pipe; and
   a controller operably coupled to switch each of the first and second valves between open and closed positions, the controller having a control configuration comprising:
   receiving a triggering input signal indicating that the refrigerant pressure difference within the HVAC system is above a tolerance value, wherein the tolerance value represents the maximum permitted refrigerant pressure difference during non-operating time of the one or more compressors;
   selecting, in response to the triggering input signal, at least the first pipe as a refrigerant flow path for reducing the refrigerant pressure difference within the HVAC system;
   generating a first control signal opening at least the first valve permitting refrigerant to flow through the first valve, dissipating a refrigerant pressure difference across the first valve;
   maintaining at least the first valve open for a defined period of time; and
   generating a second control signal for switching the position of at least the first valve.

2. The apparatus of claim 1, wherein the triggering input signal indicates a demand on the HVAC system requiring energizing of at least one of the one or more compressors following a period in which each of the one or more compressors was de-energized.

3. The apparatus of claim 1, wherein the triggering input signal indicates de-energizing of each of the one or more compressors at an end of demand on the HVAC system which required energizing of at least one of the one or more compressors.

4. The apparatus of claim 1, wherein the triggering input signal indicates an initial powering of the HVAC system.

5. The apparatus of claim 1, further comprising:
   a first sensor coupled to the common discharge pipe, the first sensor configured to transmit a first signal directly or via one or more intermediate devices to a location remote to the first sensor, the first signal indicating one or more pressures of refrigerant within the common suction pipe;
   a second sensor coupled to the common suction pipe, the second sensor configured to transmit a second signal directly or via one or more intermediate devices to a location remote to the second sensor, the second signal indicating one or more pressures of the refrigerant within the common suction pipe;
   the controller operably coupled to receive the first and second signals indicating one or more pressures of refrigerant within the common discharge pipe and common suction pipe, the controller having a control configuration comprising:
   receiving from the first sensor the first signal indicating one or more pressures of refrigerant within the common discharge pipe;

receiving from the second sensor the second signal indicating one or more pressures of refrigerant within the common suction pipe;

determining, while the one or more compressors are each de-energized, a first refrigerant pressure difference value using at least the first and second signals; and determining whether the first refrigerant pressure difference value exceeds the tolerance value.

6. The apparatus of claim 1, wherein the defined period of time is between 60 and 510 seconds.

7. The apparatus of claim 1, wherein the defined period of time is the amount of time required for the refrigerant pressure difference within the HVAC system to fall to below the tolerance value.

8. The apparatus of claim 7, further comprising:

a first sensor coupled to the common discharge pipe, the first sensor configured to transmit a first signal directly or via one or more intermediate devices to a location remote to the first sensor, the first signal indicating one or more pressures of refrigerant within the common suction pipe;

a second sensor coupled to the common suction pipe, the second sensor configured to transmit a second signal directly or via one or more intermediate devices to a location remote to the second sensor, the second signal indicating one or more pressures of the refrigerant within the common suction pipe;

the controller operably coupled to receive the first and second signals indicating one or more pressures of refrigerant within the common discharge pipe and common suction pipe, the controller having a control configuration comprising:

receiving from the first sensor the first signal indicating one or more pressures of refrigerant within the common discharge pipe;

receiving from the second sensor the second signal indicating one or more pressures of refrigerant within the common suction pipe;

determining a first refrigerant pressure difference value using at least the first and second signals; and determining whether the first refrigerant pressure difference value exceeds the tolerance value.

9. The apparatus of claim 1, wherein the second pipe is not selected as part of the refrigerant flow path for reducing the refrigerant pressure difference within the HVAC system.

10. The apparatus of claim 1, wherein the control configuration further comprises:

if an input signal indicating a demand on the HVAC system requiring energizing of at least one of the one or more compressors is received, generating a second control signal opening at least the first valve; and if an input signal indicting a demand on the HVAC system requiring energizing of at least one of the one or more compressors is not received, generating a second control signal closing the first and second valves.

11. The apparatus of claim 1, wherein the first and second valves are each solenoid valves configured for normally-closed operation.

12. A method of dissipating a refrigerant pressure difference within an HVAC system during non-operating time, the method comprising:

coupling a compressor section to a first heat exchanger and a second heat exchanger, the compressor section comprising one or more compressors, wherein each compressor receives low pressure refrigerant from the first heat exchanger through a common suction pipe and discharges high pressure refrigerant to the second heat exchanger through a common discharge pipe during operating time of the HVAC system;

coupling a first pipe to a common high pressure pipe at an inlet of the first pipe for receiving high pressure refrigerant from the second heat exchanger through the common high pressure pipe;

coupling the first pipe to a common low pressure pipe at an outlet of the first pipe for routing low pressure refrigerant to the first heat exchanger through the common low pressure pipe;

coupling a first valve to the first pipe, the first valve configured to permit refrigerant flow through the first pipe when in an open position and configured to prevent refrigerant flow through the first pipe when in a closed position;

coupling a first metering device to the first pipe, the first metering device configured to throttle flow of refrigerant through the first pipe;

coupling a second pipe to the common high pressure pipe at an inlet of the second pipe for receiving high pressure refrigerant from the second heat exchanger through the common high pressure pipe;

coupling the second pipe to the common low pressure pipe at an outlet of the second pipe for routing low pressure refrigerant to the second heat exchanger through the common low pressure pipe;

coupling a second valve to the second pipe, the second valve configured to permit refrigerant flow through the second pipe when in an open position and configured to prevent refrigerant flow through the second pipe when in a closed position;

coupling a second metering device to the second pipe, the second metering device configured to throttle flow of refrigerant through the second pipe;

operably coupling a controller to the first and second valves for switching each of the first and second valves between open and closed positions;

receiving, using the controller, a triggering input signal indicating that the refrigerant pressure difference within the HVAC system is above a tolerance value, wherein the tolerance value represents the maximum permitted refrigerant pressure difference during non-operating time of the one or more compressors;

in response to receiving the triggering input signal, selecting, using the controller, at least the first pipe as a refrigerant flow path for reducing the refrigerant pressure difference within the HVAC system;

generating, using the controller, a first control signal opening at least the first valve permitting refrigerant to flow through the first valve, dissipating a refrigerant pressure difference across the first valve;

maintaining, using the controller, at least the first valve open for a defined period of time; and generating, using the controller, a second control signal for switching the position of at least the first valve.

13. The apparatus of claim 12, wherein the triggering input signal indicates a demand on the HVAC system requiring energizing of at least one of the one or more compressors following a period in which each of the one or more compressors was de-energized.

14. The apparatus of claim 12, wherein the triggering input signal indicates de-energizing of each of the one or more compressors at an end of demand on the HVAC system which required energizing of at least one of the one or more compressors.

15. The apparatus of claim 12, wherein the triggering input signal indicates an initial powering of the HVAC system.

16. The method of claim 12, wherein the defined period of time is between 60 and 510 seconds.

17. The apparatus of claim 12, wherein the defined period of time is the amount of time required for the refrigerant pressure difference within the HVAC system to fall to below the tolerance value.

18. The method of claim 12, wherein the first and second valves are each solenoid valves configured for normally-closed operation.

\* \* \* \* \*